Patented July 10, 1945

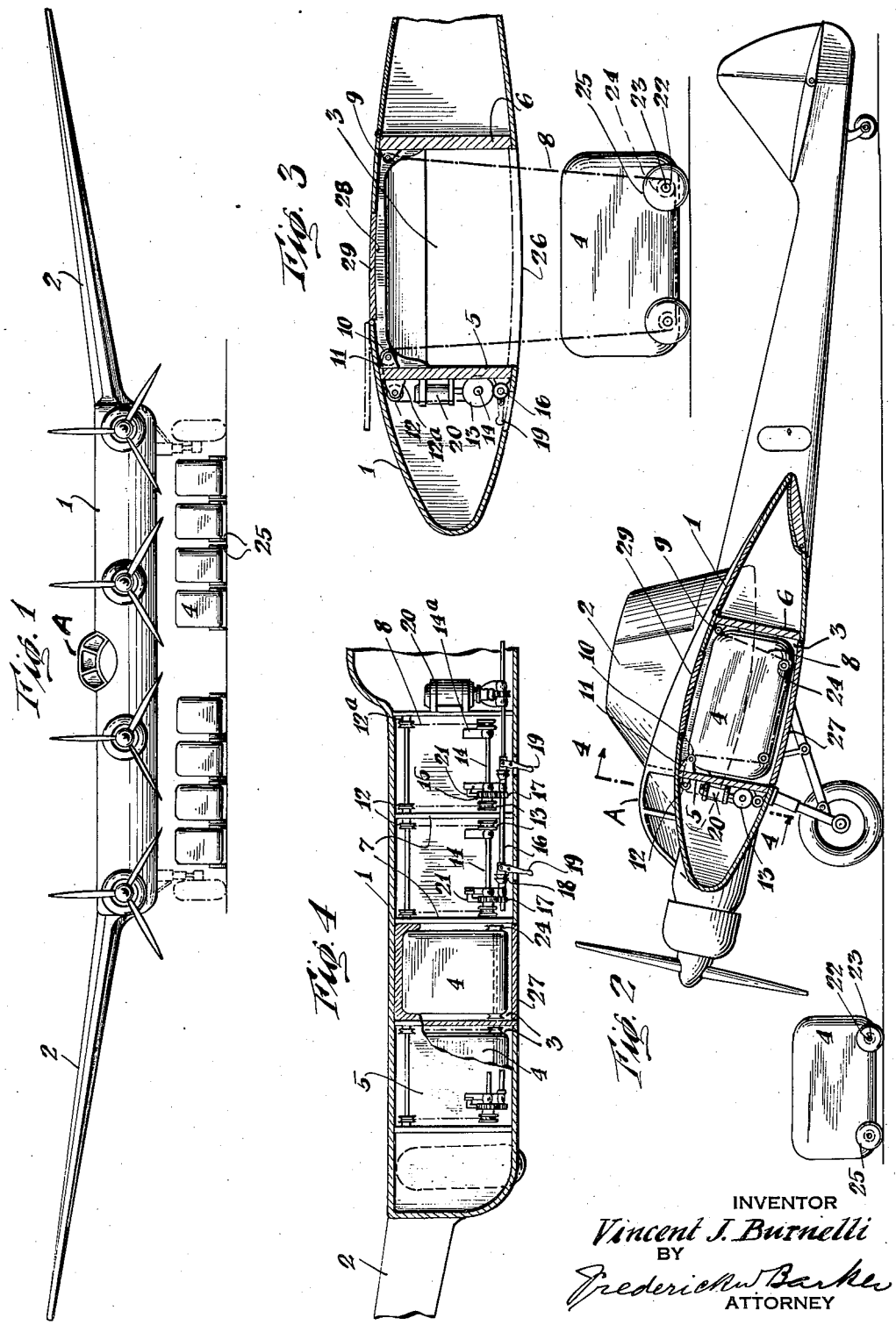

2,380,290

UNITED STATES PATENT OFFICE 2,380,290

CARGO CARRYING AIRPLANE

Vincent J. Burnelli, Matawan, N. J., assignor to V. J. Burnelli Airplanes Inc., Red Bank, N. J., a corporation of New Jersey Application September 6, 1941, Serial No. 409,785

2 Claims. (Cl. 244—118)

This invention relates to cargo transport airplanes and my improvements are directed to the use of Burnelli type, airfoil fuselage all-wing airplanes, with means incorporated therein to facilitate the reception, storage and delivery of freight containers, which freight may be gasolene, military equipment, food stuffs or in fact any articles intended for civilian or military needs.

In war time emergency, with airports located on islands and advance landing fields inaccessible for surface transport and liable to be bombed by the enemy, and stationary fuel supplies destroyed, it is apparent that in such emergency practical means for the delivering of fuel and oil, where needed, for the servicing of military aircraft is essential. This particular function is uppermost in the design proposed for transporting gasolene in large quantities, also lubricating oil, to distant points for airplane refueling and servicing means. However, the container method which also provides storage facilities does not restrict the use of the aircraft to that service but is convertible for other freight or for personnel.

Obviously the conventional type of airplane, with its long, stream-lined body, is not as suited to convey a large cargo of liquid fuel, as projected, 8,000 gallons, weighing 48,000 pounds, whether in an integral tank or separate containers. The matter of longitudinal balance and stability restricts such use and the load would have to be compartmented fore and aft about the centre of gravity to assure that no shift in the load would occur as the angle of the fuselage would change during flight. This would necessitate divisional loading and unloading to maintain balance. Also the fuselage structure is not efficiently adaptable for the loading and unloading of containers of 1,000 gallons each required for the large volume of gasolene to be carried for practical service value.

But the lifting fuselage of the Burnelli type all-wing airplane lends itself ideally to the purpose in mind. For such fuselage, which is relatively short in length and wide in span, has the wing beams bordering the cargo section which lies close to the centre of gravity of the airplane and thus is inherently adapted for the structural support of the great load and with minimum disturbance to the longitudinal balance of the airplane.

While it is true that the lifting fuselage might function as a tank, to contain the liquid fuel in bulk, without the structural disadvantage inherent to a conventional type fuselage and the ill effect to longitudinal stability, practical considerations, especially for military service, incline to the use of the lifting fuselage as a receptacle for containers, of which a number that may be made of moulded plastic plywood or other available material, each filled with gasolene, may be arranged laterally in said fuselage and suspended from the fuselage wing beams, thereby requiring no additional major structure. Each container may carry as much fuel as is required to supply a medium sized airplane, such as a bomber requiring 1000 gallons, and the carrier airplane may be moved, either by taxiing or by flight, to deliver required fuel containers at various points for squadron servicing or storage in separated locations to include supply for other service military equipment.

For loading and unloading purposes the carrier airplane is provided with bottom openings which communicate with compartments each adapted to receive a container, said compartments extending spanwise through the lifting fuselage. These compartments are each provided with hoisting means adapted for lifting a container thereinto through its bottom opening, whereafter the cover is to be replaced. Upon arrival at the distination the cover is removed and then the container is to be lowered through the bottom opening to the surface.

According to my invention the containers are individually hoisted into and lowered out of their respective compartments, for which purpose the power equipment employed includes a main shaft, while jack shafts for each compartment, deriving motion selectively from said main shaft, serve to operate cable pulley means for individual containers.

Other features and advantages of my invention will hereinafter appear.

In the drawing:

Figure 1 is a front elevation of an all-wing airplane, having its central wing section of relatively large span, and showing containers (for gasolene or other contents), disposed on the surface in position to be loaded into said central wing section, or as delivered therefrom.

Fig. 2 is a side sectional view, on a larger scale.

Fig. 3 is a further enlarged, partial view of the central wing section, showing a compartment therein and a container in position to be hoisted thereinto, and Fig. 4 is a section on the line 4—4 of Fig. 2.

In the views let 1 indicate the central wing section of a four engined, Burnelli type all-wing airplane, having the outspanned wing sections 2.

Extended spanwise through the central wing section 1 is a series of compartments 3, each adapted for the reception of a container 4, such as is capable of holding gasolene, lubricating oil, or other contents.

It will be noted that the compartments 3 are located between the front wing beam 5 and rear wing beam 6, and said compartments may be bounded laterally by partitions 7.

Since the compartmented space in the central wing section lies between the front and rear wing beams it follows that said space is within the longitudinal area occupied by the centre of gravity of the airplane and thus the weight of the filled containers fails to affect flight stability.

A cable 8 is shown in Fig. 3 as secured to a lug 9 fixed to the rear wing beam 6 at the upper end thereof, said cable serving as a sling to carry a container 4 in a manner to be described hereinafter. The cable 8 is passed over a pulley 10 that is mounted in a lug 11 secured to the inner surface of wing beam 5, said cable thence passing through said wing beam and over a pulley 12 that is mounted on a lug 12a which extends from the forward surface of wing beam 5, the cable thence continuing to a drum 13, carried by a shaft 14 that is journalled in brackets 14a secured to the wing beams.

It is to be understood that two cables 8 are employed together with their respective anchorages, pulleys and drums, these cables serving to engage a container at opposite sides thereof. Also, it must be stated that the shafts 14, which carry gears 15, are driven by a main shaft 16 through the medium of a gear 17 that meshes with gear 15, said gear 17 being idle on shaft 16 until engaged therewith as by a clutch 18 that is hand operated by a lever 19. A reversible electric motor 20, with self locking worm drive means is employed to drive shaft 16.

In the example illustrated there appears a crew compartment A in the spanwise centre of the central wing section, and the compartments 3 are arranged in two series, respectively at opposite sides of said compartment A.

The hoisting drums for each compartment operate to both wind and unwind the cables, and ratchet latches 21 secure said drums from rotation so that the container supported thereby may be held in its position within a compartment.

The containers employed are each provided with tubular bearing supports 22 for wheel axles 23, said supports 22 being secured leak-tight to the container walls. Ball-bearing aircraft pulleys 24 are mounted on supports 22 and serve as spacers for the wheels 25 besides performing their function of engaging the cables 8, which latter thus support the container while it is within its compartment as well as when it is being raised into said compartment or lowered therefrom. The wheels 25 are removable from their axles, so that the containers may be placed in the compartments without the wheels, which latter can be applied to the axles when needed for trundling the containers on the surface.

The compartments 3 are each contoured at their upper, inner surfaces to agree with the upper contour of the containers so that a container may have a saddle-like contact with the compartment when the cable sling has hoisted said container into said compartment.

The bottom openings 26 of compartments 3, through which the containers are entered and removed, are normally closed by a closure member 27, these members 27, when in place, being secured by any suitable fastening means.

Also the upper covering of the compartments may have openings 28 for use when articles are to be deposited therein from above, and said openings may be provided with suitable covers, such as indicated at 29.

Variations within the spirit and scope of my invention are equally comprehended by the foregoing disclosure.

I claim:

1. In an all-wing airplane, having a wide central wing section, front and rear beams in said section, a series of compartments permanently fixed between said wing beams in said central wing section, spanwise thereof, each compartment having a bottom opening and a top, removable containers for said compartments having an upper contour agreeing with the lower contour of the top of said compartment for providing a snug fit between the upper surface of the container and the lower surface of the top when the container is disposed in position within the compartment, a cable for each compartment anchored to one of said wing beams, pulleys and a drum for each compartment connected to the other wing beam, the cable being passed over said pulleys and engaged with said drum to be wound on the latter, a single main shaft extending transversely across the central wing section, a motor to drive said shaft, an individual jack shaft mounted in each compartment to rotate the drum therefor, clutch and gear means between the main shaft and each jack shaft for the selective operation of the latter, and pulley means on each container for engagement by said cable in the manner of a sling to move said container into and out of its individual compartment.

2. In an all-wing airplane, having a wide central section of relatively short chord constituting a lifting fuselage, front and rear wing beams in said section, a crew compartment located in the center of said lifting fuselage, a series of compartments fixed in said lifting fuselage at opposite sides of said crew compartment and arranged spanwise throughout the width of said lifting fuselage, said compartments to contain the entire useful load, said wing beams defining the front and rear limits of each of the compartments, and power plants disposed toward the lateral extremities of said lifting fuselage, forwardly projecting propellers on said power plants, said front and rear wing beams and the longitudinal axes of said power plants defining an area which includes the centre of gravity of the aircraft, the compartments of said series each having a bottom opening, and containers removably fitting said compartments respectively.

VINCENT J. BURNELLI.